(12) United States Patent
Bennett et al.

(10) Patent No.: US 9,696,513 B2
(45) Date of Patent: Jul. 4, 2017

(54) MULTICORE OPTICAL FIBERS AND METHODS OF MANUFACTURING THE SAME

(71) Applicant: Corning Cable Systems, LLC, Hickory, NC (US)

(72) Inventors: Kevin Wallace Bennett, Hammondsport, NY (US); Seldon David Benjamin, Painted Post, NY (US); Douglas LLewellyn Butler, Painted Post, NY (US); William Carl Hurley, Hickory, NC (US)

(73) Assignee: Corning Optical Communications LLC, Hickory, NC (US)

( * ) Notice: Subject to any disclaimer, the term of this patent is extended or adjusted under 35 U.S.C. 154(b) by 747 days.

(21) Appl. No.: 14/136,434

(22) Filed: Dec. 20, 2013

(65) Prior Publication Data

US 2016/0223774 A1 Aug. 4, 2016

Related U.S. Application Data (60) Provisional application No. 61/907,755, filed on Nov. 22, 2013.

(51) Int. Cl.
*G02B 6/44* (2006.01)
*G02B 6/36* (2006.01)
(Continued)

(52) U.S. Cl.
CPC ........ *G02B 6/4482* (2013.01); *C03C 25/1065* (2013.01); *C03C 25/12* (2013.01);
(Continued)

(58) Field of Classification Search
CPC .............. G02B 6/4482; G02B 6/02042; G02B 6/02395; G02B 6/04; G02B 6/3831;
(Continued)

(56) References Cited

U.S. PATENT DOCUMENTS 5,082,347 A * 1/1992 Akasaka ............... G02B 6/4482
385/114
5,729,966 A 3/1998 Grulick .......................... 57/293
(Continued)

FOREIGN PATENT DOCUMENTS

JP 2011158768 * 8/2011 ............... G02B 6/04
JP 2011158768 A 8/2011
(Continued)

OTHER PUBLICATIONS

Presby, H.M., "Ultraviolet-excited fluorescence in optical fibers and preforms", Applied Optics, vol. 20, No. 4, pp. 701-706, Feb. 15, 1981.
(Continued)

*Primary Examiner* — Akm Enayet Ullah
*Assistant Examiner* — Michael Mooney
(74) *Attorney, Agent, or Firm* — William D. Doyle (57) ABSTRACT

A multicore optical fiber with a reference section having a material defining a marked multicore glass optical fiber. The multicore fibers can be in groupings, for example, the groupings can be in the form of one of an optical fiber ribbon covered by a matrix, and a tight buffered cable. Fiber optic connectors can be assembled to the multicore optical fiber at either or both ends, and the colored portion can be associated with the optical fiber connector aligning the optical core elements with the optical connectors. The assembly can have at least one transceiver device with a transmit port and a receive port defining a two-way communication channel. Further aspects describe methods of manufacturing multicore fibers including application of curable coatings and reference sections.

6 Claims, 7 Drawing Sheets

(51) Int. Cl.
*G02B 6/02* (2006.01)
*C03C 25/10* (2006.01)
*C03C 25/12* (2006.01)
*H04B 10/40* (2013.01)
*G02B 6/38* (2006.01)
*G02B 6/42* (2006.01)

(52) U.S. Cl.
CPC ..... *G02B 6/02042* (2013.01); *G02B 6/02395* (2013.01); *G02B 6/4403* (2013.01); *G02B 6/4486* (2013.01); *H04B 10/40* (2013.01); *G02B 6/3831* (2013.01); *G02B 6/3851* (2013.01); *G02B 6/3885* (2013.01); *G02B 6/4246* (2013.01); *G02B 6/4249* (2013.01); *G02B 6/4292* (2013.01)

(58) Field of Classification Search
CPC .. G02B 6/3851; G02B 6/3885; G02B 6/4246; G02B 6/4249; G02B 6/4292; G02B 6/4403; G02B 6/4404; G02B 6/4433; G02B 6/448; G02B 6/4411; G02B 6/4486; C03C 25/12; C03C 25/1065; H04B 10/40; B29C 2035/0827; G01H 9/004
USPC .................................. 385/100, 114, 123–128
See application file for complete search history.

(56) References Cited

U.S. PATENT DOCUMENTS

| | | | |
|---|---|---|---|
| 5,904,037 A | 5/1999 | Grulick et al. | 57/264 |
| 6,106,368 A | 8/2000 | Childers et al. | 451/28 |
| 6,154,594 A | 11/2000 | Fiacco et al. | 385/126 |
| 6,293,081 B1 | 9/2001 | Grulick et al. | 57/293 |
| 6,539,151 B2 | 3/2003 | Fajardo et al. | 385/114 |
| 7,900,481 B2 | 3/2011 | Gallagher et al. | 65/409 |
| 8,433,166 B2 | 4/2013 | Nagashima et al. | 385/124 |
| 9,057,815 B2 | 6/2015 | Butler et al. | |
| 2013/0044978 A1 | 2/2013 | Dedobbelaere et al. | |
| 2013/0170804 A1* | 7/2013 | Hayashi | G02B 6/02042 385/128 |
| 2013/0177273 A1 | 7/2013 | Alfano et al. | G02B 6/105 |

FOREIGN PATENT DOCUMENTS

| | | | |
|---|---|---|---|
| JP | 2013-50695 | 3/2013 | G02B 6/255 |
| WO | 2012/121027 | 9/2012 | G02B 6/255 |

OTHER PUBLICATIONS

Patent Cooperation Treaty, International Search Report for PCT/US2014/063989, mail date Sep. 15, 2015, 4 pages.

* cited by examiner

MULTICORE OPTICAL FIBERS AND METHODS OF MANUFACTURING THE SAME

This application claims the benefit of priority under 35 U.S.C. §119 of U.S. Provisional Application Ser. No. 61/907,755 filed on Nov. 22, 2013 the content of which is relied upon and incorporated herein by reference in its entirety.

BACKGROUND

Field

The present disclosure generally relates to optical fibers and, more specifically, to multicore optical fibers.

Technical Background

Optical fiber is the leading alternative to traditional materials used for data signal communication such as copper wiring. Optical fiber is now widely utilized in a variety of electronic devices and systems to facilitate the high-speed communication of voice, video, and data signals at high bandwidths. However, as the speed and bandwidth of the electronic systems increases, there is a corresponding need to increase the speed of optical interconnects which interconnect components of the system. One solution to increase the speed of optical interconnects is to increase the fiber density of the optical interconnects. However, increasing the number of individual fibers in an optical interconnect increases the overall size and cost of the optical interconnect. To avoid the increased fiber count, multicore optical fibers ("MCFs") have been developed. MCFs contain optical core elements contained in a single fiber. The core elements are designed for, for example, the transmission and receiving of data, and can be arranged as transmit and receive (Tx/Rx) pairs. Such MCFs may be used in data networks to enable high speed Tx/Rx transmission of data between system components such as transceivers, processors, servers, and storage devices. For connection and termination in the networks, connectors are attached to the MCFs. For correct Tx/Rx optical transport and connections to be manufactured, it is important for the operators to know the orientation of the optical fibers when the connectors are terminated to the MCFs.

SUMMARY

According to embodiments of the present disclosure, a multicore optical fiber for use with, for example, at least one transceiver device, for example, an opto/electronic comprises optical core elements, the optical core elements comprising an array of at least two optical core elements contained within a common outer cladding, the common outer cladding being at least partially surrounded by a coating layer, the respective centers of the optical core elements being aligned along a first reference line and being capable of transmitting data, and the multicore optical fiber comprising at least one colored portion defining a marked multicore fiber. The colored portion can be selected from a UV light curable resin material and an ink material and combinations thereof, and the coating layer can include a color and the least one colored portion can include a relatively distinct color compared to the coating layer color. The colored portion can extend along the multicore optical fiber and can be in the form of one of a continuous line, an intermittent line, a ring, or combinations thereof. In addition, the colored portion can be one of a co-extruded layer adjacent the coating layer and a material applied to an outer surface of the coating layer and combinations thereof. The colored portion is disposed generally in alignment with the reference line, or it can be disposed in other positions, for example, generally above the reference line.

Marked multicore fibers can be arranged in groupings. For example, the groupings can be in the form of one of an optical fiber ribbon covered by a matrix, and a loosely disposed group of marked multicore optical fibers, and combinations thereof. Moreover, a cable jacket can surround at least one marked multicore optical fiber and at least one strength member. In addition, the marked multicore optical fiber can be part of an assembly comprising at least one opto/electronic transceiver system with at least one transmit port and at least one receive port defining at least one two-way communication channel moreover, at least one fiber optic connector can be assembled to the marked multicore optical fiber, and the colored portion can be associated with the optical fiber connector aligning the optical core elements indicating alignment of the optical elements with the optical connector.

Further embodiments describe methods of manufacturing multicore fibers and others aspects according to the foregoing. An exemplary method comprises the steps of translating an uncoated multicore optical fiber between an energy source and a detector, directing a beam of the energy source so that it at least partially impinges upon the multicore optical fiber causing an image to be detected by the detector, and the detector sending output to a controller, the controller determining the orientation of at least some of the core elements in the multicore optical fiber, and controlling a spinning or traction device and thereby adjusting the orientation of the multicore optical fiber in relation to its optical core elements and a coating die, passing the multicore optical fiber through the coating die and applying a material to the multicore optical fiber thus defining a coating portion, and applying a material in the form of a colored portion being visually distinct from the coating portion.

Variations of the foregoing methods are included as embodiments of the disclosure. For example, the step of detecting the image of at least some of the core elements can include at least partial absorption of the energy by at least one dopant which is respectively part of the optical core elements, and the dopant can be, for example, a germanium dopant. Other dopants can be used in accordance with the disclosure which will potentially result in alternative absorption and transmittance characteristics. Alternatively, the step of energy absorption can cause fluorescence and the step of determining the orientation of at least some of the core elements can involve imaging of the fluorescence. In yet another alternative, the step of energy absorption can cause index of refraction differences and the step of detection of the image can thus be based upon interferometry.

As to the manufacturing line embodiments of the disclosure, determining the orientation of at least some of the core elements in the multicore optical fiber can include programming at least one characteristic absorption wavelength band of the dopant and cladding in an imaging system. In other embodiments, applying a material to the coating portion can include a colored portion visually distinct from the coating portion including one of co-extruding the colored portion and of applying an ink to the outer surface of the coating portion, and combinations thereof. In yet further embodiments of the disclosure, applying the colored portion can comprise one of forming the colored portion with one or more stripes, dashes, rings, or a series of rings and stripes thereon, and combinations thereof. As to exemplary groupings of marked multicore optical fibers, the manufacturing method can comprise translating at least two multicore optical fibers, aligning the colored portions respectively of the multicore optical fibers, coating the multicore optical fibers with a matrix material so they are contained in the matrix, curing the matrix material, and optionally applying a reference section to the matrix.

As alternative processes of the embodiments disclosed herein, translating the multicore optical fibers can include drawing an uncoated multicore optical fiber from a draw tower or supplying a multicore fiber with a colored portion from a reel. As to the draw tower alternative, the step of coating the multicore optical fiber can occur after cooling of the multicore optical fiber. Moreover, determining the core element orientation can occur prior to the coating application step and can include controlling the traction device prior to application of the coating. Furthermore, the steps of applying the colored portion can be one of various embodiments for example: directly applying the colored portion to the glass after a cooling step but prior to the coating application step, directly applying the colored portion to the coating after the coating step but before a curing step of the coating, directly applying the colored portion to the coating after a curing step of the coating, and combinations thereof.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings. Moreover, it is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The appended drawings are made a part of this disclosure.

DETAILED DESCRIPTION

Figure 1:
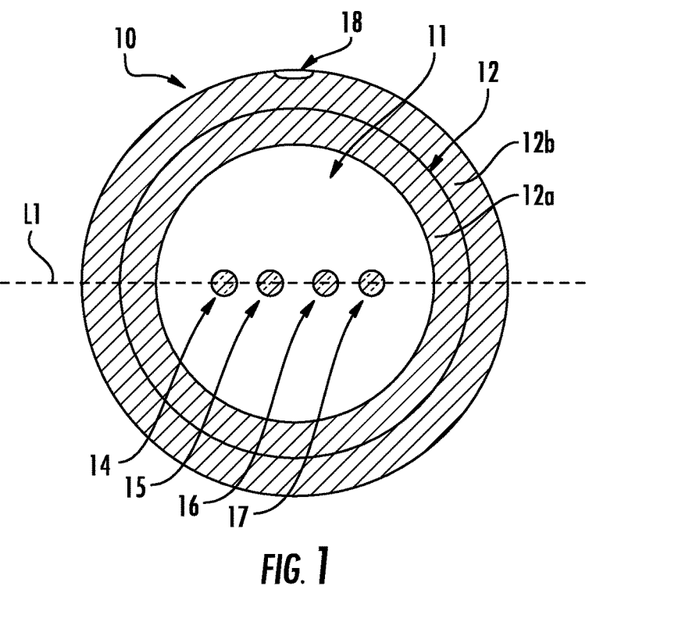
FIG. 1 schematically depicts one embodiment of a multicore optical fiber according to one or more embodiments shown and described herein before application of a colored portion.
Figure 2:
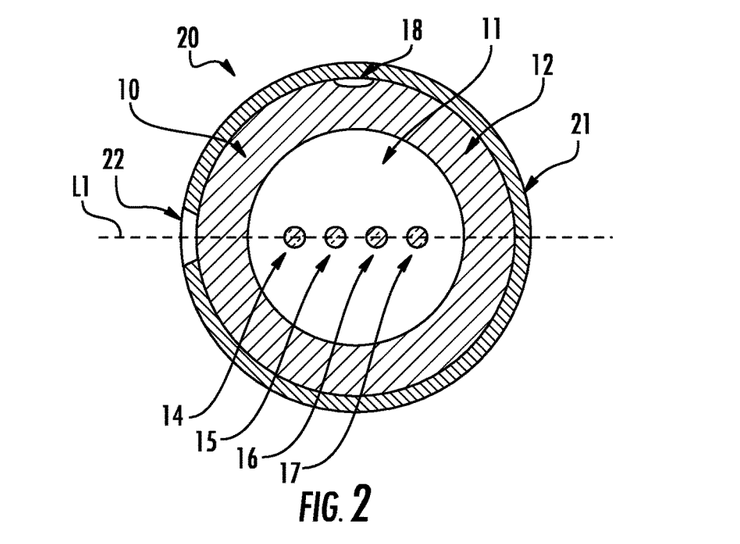
FIG. 2 schematically depicts an embodiment of a marked multicore optical fiber according to one or more embodiments shown and described herein with at least one colored portion, for example, disposed along a common axis of the core elements.
Figure 11:
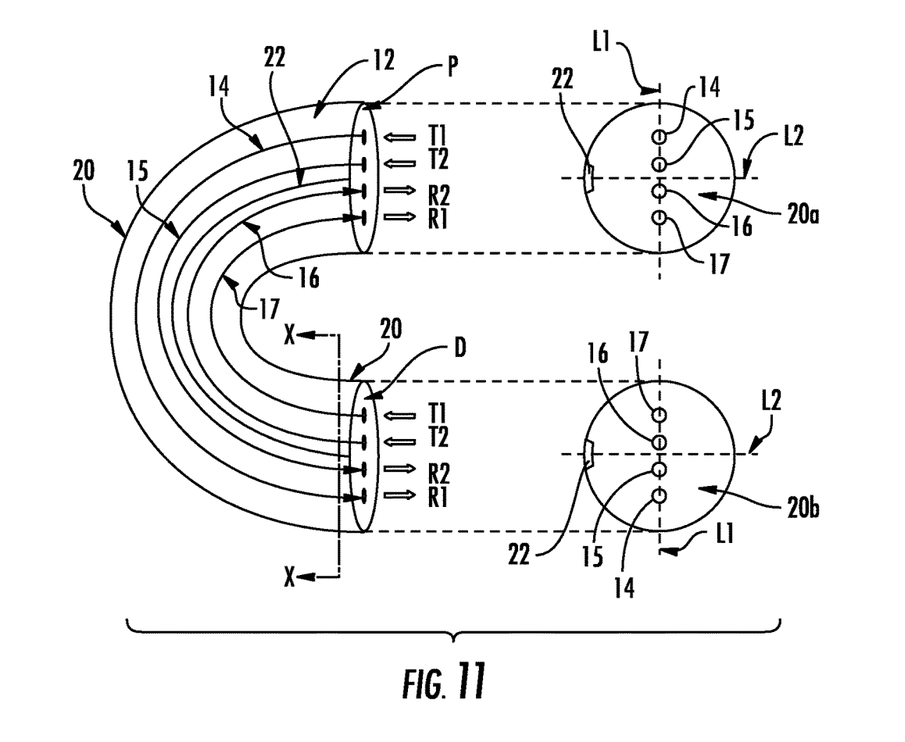
FIG. 11 schematically depicts another embodiment of a multicore optical fiber according to one or more embodiments shown and described herein with an exemplary Tx/Rx capability illustrated.

Reference will now be made in detail to various embodiments of multicore optical fibers, examples of which are illustrated in the accompanying drawings. Whenever possible, the same reference numerals will be used throughout the drawings to refer to the same or like items. More specifically, one embodiment of a multicore optical fiber ("MCF") generally comprises a common outer cladding formed from silica-based glass and having a cladding index of refraction. At least one optical core element, for example, a single mode core element or a multimode core element, or a combination of such elements, are disposed in the common outer cladding. The core element(s) are formed from, for example, silica-based glass with a higher index of refraction than the cladding. A center-to-center spacing between adjacent core elements is for example, greater than or equal to about 25 nm or less. Various embodiments of multicore optical fibers and methods for forming the same will be described in more detail herein with specific reference to the appended drawings. The term "multimode" as used herein refers to a core element which supports the propagation of multiple modes of light at the specified wavelength(s) of, for example, 850 nm to 1550 nm. Multicore fibers are made by exemplary processes disclosed in Corning Incorporated U.S. Pat. Nos. 6,539,151 and 6,154,594, both of which are respectively relied upon and incorporated by reference herein. The multicore fibers of the embodiments of the disclosure shown, for example in FIGS. 1, 2, and 11, are exemplary and include generally round outer shapes and round optical core elements 14,15,16,17. However, the optical core elements can be other shapes such as rectangular, polygonal, flat, or elliptical as shown in US Patent Publication No. US 20130177273 A1, which is relied upon and incorporated by reference herein. In addition, forms of multicore fibers other than round, such as rectangular, hexagonal, partly flat and partly rounded forms, and multicore fibers made with a series of curved surfaces such as are as disclosed U.S. Ser. No. 13/485,192, which is relied upon and incorporated by reference herein, can be used with embodiments of the present disclosure.

Figure 12:
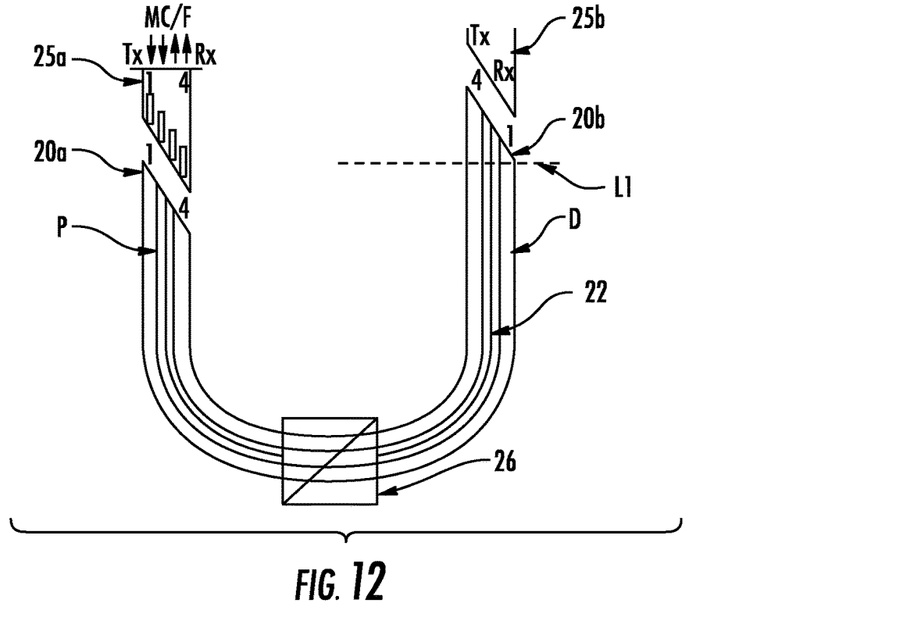
FIG. 12 schematically depicts another embodiment of a multicore optical fiber according to one or more embodiments shown and described herein with an exemplary Tx/Rx interface with optical connectors illustrated.
Figure 13:
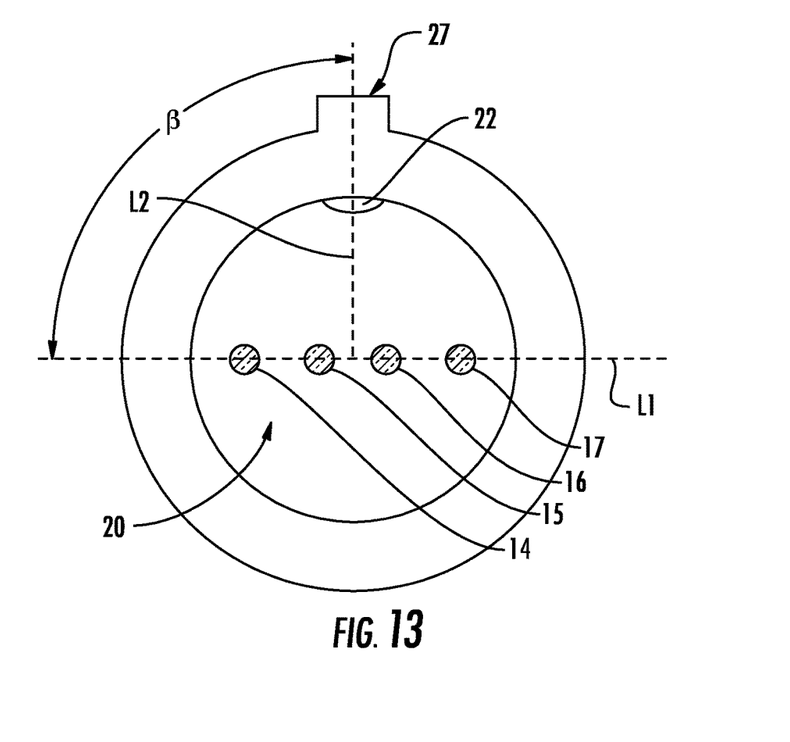
FIG. 13 schematically depicts another embodiment of a multicore optical fiber according to one or more embodiments shown and described herein with an exemplary interface with a keyed optical connector illustrated

FIG. 1 depicts a MCF component 10 with optical core elements, for example, core elements 14, 15, 16, and 17 contained within a common outer cladding 11 that is covered by a coating system 12 comprising a primary coating 12a and a secondary coating 12b defining a coating system 12. Coating system 12 comprises at least one first reference section which comprises, a UV light curable resin which is formed of, for example, a first colored material 18. Core elements 14,15,16,17 are generally aligned along their respective centers along a line "L1". The optical core elements 14,15,16,17 can be arranged in a row as shown, for example, in FIGS. 1, 2, and 10. The common outer cladding 11 comprises a silica-based glass having a cladding index of refraction. In one embodiment, optical core elements 14 and 15 are designed to communicate data, for example, to transmit data (Tx), and core elements 16 and 17 are designed to communicate data, for example, to receive data (Rx) (FIG. 11). A fiber optic connector can be attached to MCF component 10 and would connect to, for example, an opto/electronic transceiver device (FIGS. 11 and 12). The connector is keyed to align core elements 14 and 15 with the device, such as Vertical Cavity Surface Emitting Laser transmitters for Tx purposes, and core elements 16 and 17 are to be aligned with optical/electronic receiver devices for Rx purposes (FIG. 13). As stated above, MCF components 10 can have two or more single mode core elements, two or more multimode core elements, or a combination of single mode and multimode core elements disposed in common outer cladding 11.

The operator is to align the core elements 14,15,16,17 to the connectors at each end of the cable using at least one second reference section. The second reference section comprises, for example, a second colored material forming a colored portion 22 (FIG. 2) comprising a UV light curable resin. With further reference to FIG. 2, MCF component 10 includes at least one coating layer, for example, a layer 21,22 formed of, for example, at least one ink color material as a part of coating system 12 defining a marked MCF 20. For example, the coating layer includes a coating portion 21 comprising an optical fiber color such as blue or red, and at least one adjacent colored portion 22 comprising a relatively distinct color such as black or white. In exemplary embodiments, colored portion 22 is disposed in alignment with exemplary line L1, for example, and colored portion 22 can take the form of a continuous or intermittent stripe or line of constant or varying width. In other exemplary embodiments described herein, colored portion 22, is disposed in relation to the first reference section, for example, colored portion 18. Colored portion 22 is adjacent to coating portion 21 in the sense that, for example, colored portion 22 is applied to the surface of, or is alternatively co-extruded with, coating portion 21, as is further described below. The color distinction between portions 20 and 21 is observable, during a connector attachment process, by an operator with or without specialized equipment such as optical magnification or illumination equipment. As an alternative to co-extrusion, at least one colored portion 22 can be applied, in an adjacent sense, integrally with the thickness of coating 21, or applied to a surface of the coating layer with one or more applicators 36 (FIGS. 3-4) for example printing devices, for example, ink jet style printers. An applicator can form, for example, a continuous or intermittent line with dots and dashes and combinations thereof. In exemplary embodiments, the applicator can be located between a coating die and a UV-light curing device as further described below (FIG. 4).

Figure 10:
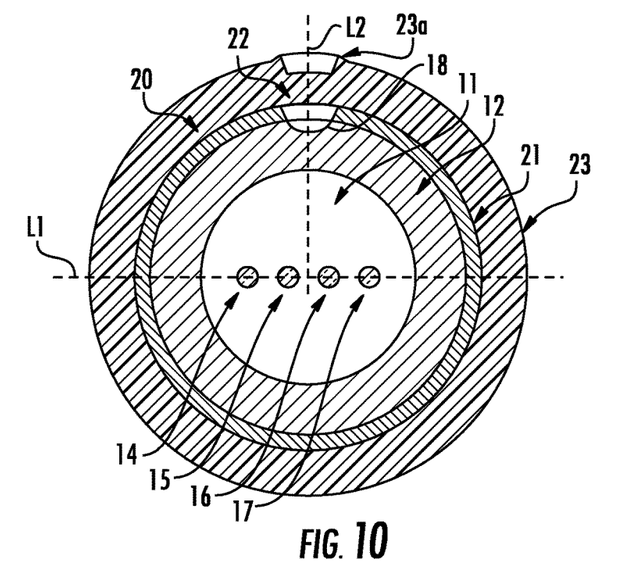
FIG. 10 schematically depicts another embodiment of a cable with at least one marked multicore optical fiber therein according to one or more embodiments shown and described herein with at least one colored portion, for example, perpendicularly disposed in relation to the common axis of the core elements.

In further exemplary embodiments, colored portion 22 can be aligned with an axis of the core elements as shown with reference to exemplary line L2 (FIG. 10) above core elements 14,15,16,17, for example, at an angle of about 90 degrees relative to line L1. The location and composition of colored portion 22, and additional colored portions 22, can be added as desired, and can be disposed at various locations relative to, for example, the center of marked MCF 20 to facilitate the operator's requirements as needed. In other words, the reference sections can be placed at various radial locations, for example, a marked MCF 20 can have at least one colored portion 18 aligned with line L2 (FIG. 10) and at least one colored portion 22 aligned with line L1 (FIG. 2), or both colored portions 18,22 can be aligned with line L2 (FIG. 10). The angular precision of colored portion 22 relative to exemplary lines L1 and L2 can be adjusted depending on the requirements for the application in which it is used. In general, for the purposes of orienting marked MCF 20 with a connector or to identify the top of a fiber in production (FIGS. 11-13), in an exemplary embodiment, the angular accuracy can be on the order of, for example, +/−1 degree of arc.

Figure 3:
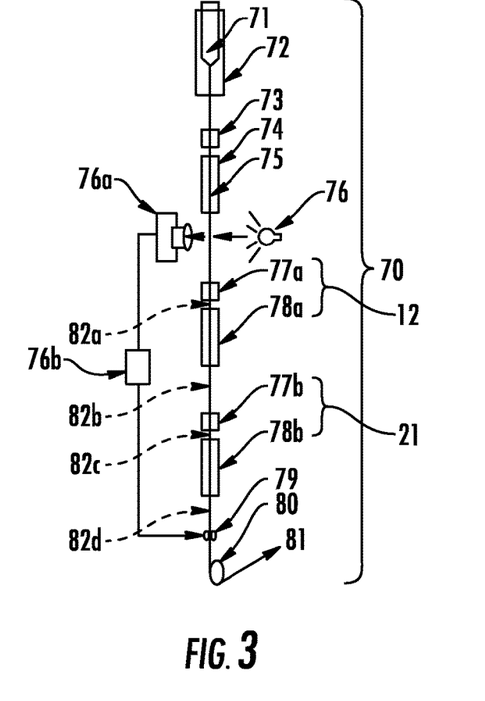
FIG. 3 schematically depicts another manufacturing process according to one or more embodiments shown and described herein for making the marked multicore fiber.
Figure 4:
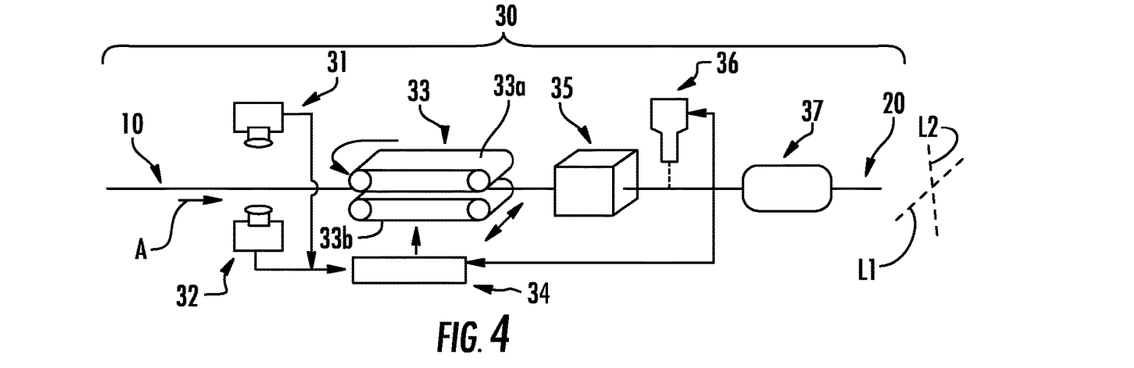
FIG. 4 schematically depicts an exemplary manufacturing process according to one or more embodiments shown and described herein for making the marked multicore fiber.

FIG. 3 depicts an exemplary glass optical fiber manufacturing process 70 such that the first reference section, for example, colored portion 18 is disposed on the optical fiber during the fiber drawing process forming a MCF component 10. A draw tower for making multicore optical fiber includes a furnace 72 for heating a glass preform 71 having a multicore fiber construction, a diameter monitor 73, and a cooling system 74 for cooling an uncoated multicore fiber 75 from a high furnace temperature to a lower temperature to allow application of, for example, UV curable acrylate coatings to protect the glass fiber from damage. Once the uncoated multicore fiber 75, containing core elements 14,15, 16,17 surrounded by clad 11 is cooled, coating system 12 is applied by a coating system 77a, and is cured by exposure to appropriate energy, for example, respective UV light sources. Coating system 77a comprises two stages, a first stage applying primary coating 12a followed by curing, and a second stage applying secondary coating 12b followed by curing, thereby defining coating system 12. In exemplary embodiments, both coatings comprise a UV curable acrylate mixture of monomers, oligomers, photoinitiators, and additives, and the mixtures are cured at respective curing stations. One such exemplary curing station 78a is shown in FIG. 3. Relevant exemplary diameters for MCF component 10 include: cladding 11 at 125 µm, primary coating 12a at 190 µm, and secondary coating 12b at 245 µm which is the diameter of the coated multicore fiber such as MCF component 10. Optionally, where extra diameter sizes are desired, the manufacturing line can include equipment applying a translucent or transparent coating portion 21 with a coating system 77b which is cured by a single stage UV light station 78b. The coated multicore optical fiber is pulled by tractor 80 in the general direction of arrow 81. An optical fiber spin device 79 can be located below the coating curing unit 78b. The fiber spin device has rotational elements engaging the fiber to allow twisting of the optical fiber back and forth.

Detection of core elements 14,15,16,17 is accomplished by monitoring their positions prior to applying the acrylate coatings to the multicore optical fiber. More specifically, prior to application of the coatings, an imaging and control system 76,76a,76b provides an energy beam source 76 emitting an energy beam of a wavelength "W". The beam impinges on uncoated multicore fiber 75 and the beam is imaged by imaging device 76a, the output thereof is sent to controller 76b which outputs a control signal to fiber spin device 79 and an applicator 36 as shown and described with reference to FIG. 4. Controller 76b is operative to control applicator 36 for control of application of the colored portion 18. Fiber rotational alignment is accomplished by fiber spin device 79 as described above which, rather than imparting a random twist, is driven by controller 76b to control angular alignment of the multicore optical fiber.

Colored portion 18 can be applied in a variety of locations to allow for variations in desired shapes and radial positions relative to the core elements. To further illustrate, colored portion 18, as described with reference to applicator 36 (FIG. 4), can be applied in various stations along the manufacturing line 70 (FIG. 3) and still be controlled by controller 76b. In other words, applicator 36 can apply the material comprising the first reference material, for example, colored portion 18, onto a wet secondary coating 12b at position 82a between coating system 77a and curing station 78a, onto a cured secondary coating 12b at position 82b between curing station 78a and coating system 77b, or by co-extrusion with secondary coating 12b. Completion of the foregoing addition of colored portion 18 produces a MCF component 10 (FIG. 1).

Manufacturing considerations play a role in electing whether to run MCF component 10 to stock on a reel and adding a coating 21 and colored portion 22 with a separate process (FIG. 4), or to optionally add coating 21 and with a second reference for example a colored portion 22 with respect to the additional thickness process described above (FIG. 3). For example, in the optional process, colored portion 22 can be added to MCF component 10 by locating applicator 36 so that it applies the reference section onto a wet secondary coating comprising coating 21 at position 82c (FIG. 3) between coating system 77b and curing station 78b, or onto a cured secondary coating comprising coating 21 at position 82d after curing station 78b. Combinations of the foregoing can be implemented as well, for example, where multiple applicators 36 are used in selected positions 82a-82d respectively.

Figure 7:
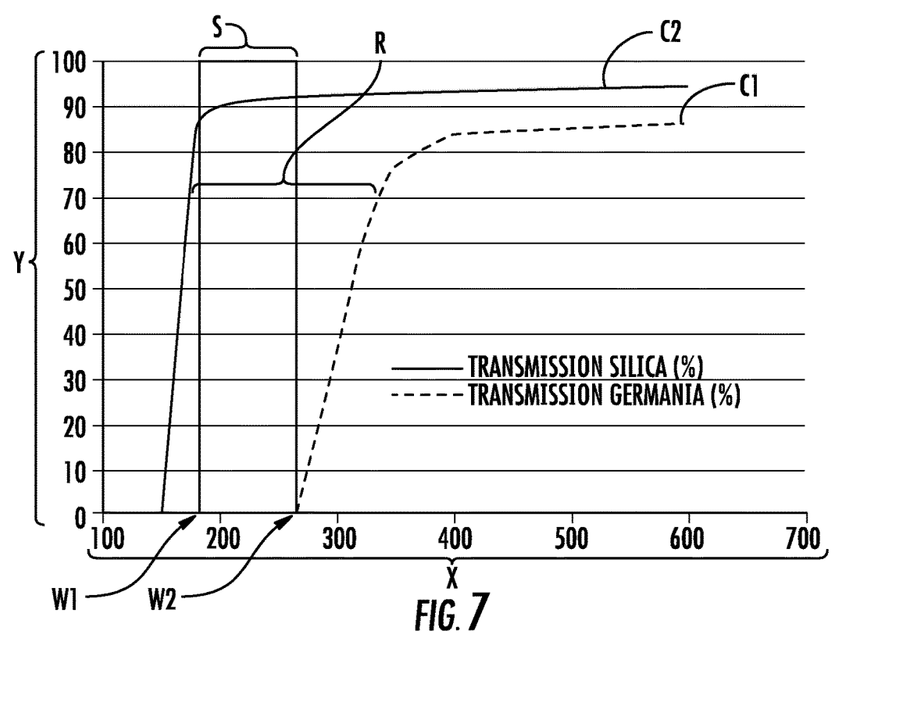
FIG. 7 schematically depicts transmission percent as a function of wavelength for glass materials according to one or more embodiments shown and described herein.

As to detection and tracking of core elements 14,15,16,17 in the process described above (FIG. 3), a first method involves the detection of the partial or complete absence of light by detector 76a. For example, light at wavelength(s) W impinges onto uncoated fiber 75 and can pass or be absorbed by the germanium dopant which is part of the core elements. The measurement by detector 76a can be done by optical imaging of a wavelength(s) of light that is highly absorbed by the germanium, causing a shadow or absence of such wavelength(s). With reference to FIG. 7, which shows transmission percent (axis Y) as a function of wavelength W measured in nanometers (axis X), germanium doped glass has a strong absorption of light at wavelengths shorter than approximately 270 nm as shown by curve C1. By comparison, strong absorption in silica glass SiO2 starts at significantly shorter wavelengths as shown by curve C2 (reference for example Applied Optics Vol. 23, No. 24, 15 Dec. 1984), in other words, the silica absorption becomes appreciable at wavelengths shorter than approximately 180 nm. Zone S, generally disposed between wavelength W1 of about 180 nm and wavelength W2 of about 270 nm, represents an exemplary spectral region for detecting Germania doped optical core elements disposed in a transparent cladding of uncoated multicore fiber 75.

Thus, shadowing measurements by the imaging control system 76,76a,76b of the shadowing effects of the germania-doped cores 14,15,16,17 embedded within the silica cladding 11 are in generally in zone S at wavelengths W1, W2 of between about 180 nm and 270 nm respectively. The transmittance, as a function of wavelength band W1,W2, and as associated with zone S, is in a range of about 80-90%. However, other transmissivities can be attained by adjusting the wavelength(s) used, for example, comprising a zone R (FIG. 7), having a wavelength of about W1 and a relatively higher wavelength of about 300 nm resulting in a transmittance range of about 70-80% through uncoated multicore fiber 75. Thus a minimum wavelength W1 of about 180 nm can be employed with embodiments of the present disclosure. A number of commercially available light sources 76 are available in the exemplary wavelength range W1,W2, including lasers at 266, 257 and 244 nm. Non-laser light sources are also available, for example, which operate (at least partially) in the W1,W2 region include Deuterium bulb (190-400 nm), Xenon (220-visible), and LED 240 nm, and available from Ocean Optics Inc.

At relatively short wavelengths, the germanium-doped cores can be caused to fluoresce and then be detected by imaging system 76,76a,76b. This is possible as germanium-doped optical fibers and preforms can fluoresce at wavelength(s) W near 420 nm when excited by UV radiation at a wavelength below 350 nm, as discussed in "*Ultraviolet-excited fluorescence in optical fibers and preforms*", Herman M. Presby, Applied Optics, Vol. 20, Issue 4, pp. 701-706 (1981). Both the absorption and fluorescence methods described above use ultraviolet light that will be largely absorbed by conventional fiber optic coatings so it is best to do these two measurements without any coatings in the optical path.

Thus light source 76, detector 76a, and controller 76b, operating as an imaging system, are to be adjusted to detect and react to the light absorption or fluorescent characteristics of the dopant associated with the optical core elements, as in this exemplary embodiment, the germanium dopant. As another alternative, light can be transmitted laterally through the uncoated fiber 75 and the index of refraction differences can be detected, again, through interferometry or commercially available imaging techniques. In all of the methods, a characteristic absorption band, for example, between wavelengths W1,W2 is to be programmed into and detected by the imaging system 76,76a,76b through uncoated multicore fiber 75.

Figure 5:
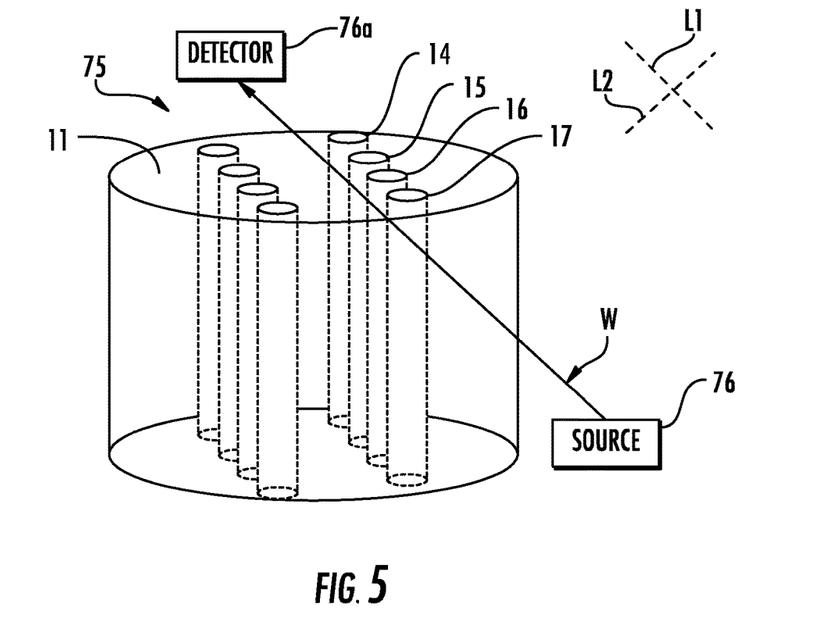
FIG. 5 schematically depicts a multicore optical fiber according to one or more embodiments shown and described herein with at least one energy beam transiting across the fiber adjacent some portions of at least one row of core elements.
Figure 6:
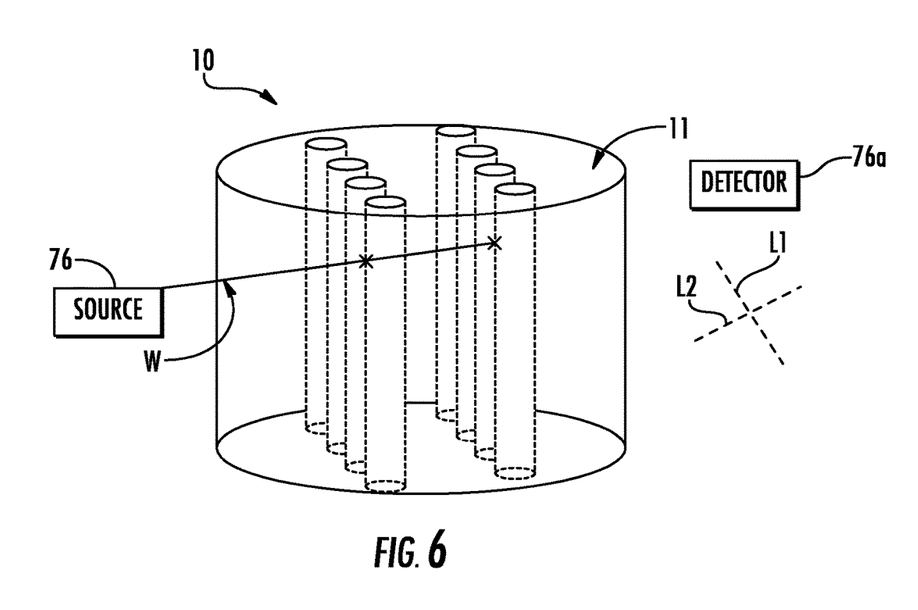
FIG. 6 schematically depicts a multicore optical fiber according to one or more embodiments shown and described herein with the at least one energy beam being intercepted by at least some portions of a one row of core elements.

To further illustrate, FIGS. 5 and 6 illustrate exemplary core element measurement orientations at a position after cooling station 74 (FIG. 3). FIG. 5 depicts light source 76 directing an energy beam such as light beam "W" comprising one or more detection wavelength(s) based on the known or characteristic absorption band, for example zones S and R, with wavelength boundaries W1,W2 based on the relevant dopant of core elements 14,15,16,17, for example, germanium, and cladding 11 (FIG. 7). Beam W transits cladding 11 between, for example, one or more rows of core elements 14,15,16,17 and shadowing of the detection wavelength(s) is detected by detector 76a (FIG. 5). For example, detection of the maximum amplitude of detection wavelength of beam W received by detector 76a, as the rotation of uncoated fiber 75 varies by control of fiber spin device 79, indicates that beam W is generally parallel to the at least one row of core elements 14,15,16,17, as is the case with line L1 (FIGS. 1-2). On the other hand, FIG. 6 depicts source 76 directing beam W toward outer cladding 11, but the detection wavelength(s) W largely impinges upon, and is partially or wholly absorbed by, the dopant of core elements 14,15, 16,17. Consequently, the detection wavelength(s) W may not be detected by detector 76a, or is otherwise at a minimum amplitude in the imaging system, as rotation of the uncoated fiber 75 varies, indicating that beam W is generally perpendicular to the at least one row of core elements, as is the case when the beam is essentially parallel to line L2 (FIG. 10).

Detector 76a will output the imaging information in either exemplary case (FIGS. 5 and 6) to controller 76b. Controller 76b contains a programmable device such as a computer or microprocessor, and it will be programmed to, as one output control signal, adjust fiber spin device 79 to control the orientation of the multifiber fiber core with respect to the core element position as imaged, for example, as by rotation of the multifiber core to allow maximum detection wavelength values to impinge on detector 76a. In other words, in the example shown in FIG. 5, controller 76b will control fiber spin device 79 so that the core elements 14,15,16,17 will be essentially parallel to beam W and line L2 whereby colored portion 18 will be applied by applicator 36 to the top of the multicore fiber (FIGS. 1, 2, and 10). Alternatively, as mentioned above, applicator 36 can be integrated into coloring die 77a, being a co-extrusion die, thereby co-extruding colored portion 18 with secondary coating 12b. Colored portion 18 can be coextruded comprising a stripe of UV curable ink material(s) of essentially the same thickness as coating system 12. In addition, applicator 36 can be mounted to be moved to different axial or radial locations relative to MCF component 10. Multiple applicators 36 can be used so that, rather than a single line or dashed stripe being formed, a radial ring of ink can be applied to coating system 12 and combinations thereof. Moreover, the multicore fiber can have a series of stripes, dashes, rings, or a series of rings and stripes on its outer surface of various or similar colors and combinations thereof.

As discussed above, MCF component 10 may be made on draw line 70, reeled, and sent to inventory in the factory. However, to further illustrate and describe the alternative process which takes as an input a MCF component 10 and produces a marked MCF 20, reference is made to FIG. 4 which depicts an exemplary manufacturing process including a marking line 30. Marking line 30 is moving product generally in the direction of arrow "A". Marking line 30 contains a scanning camera system 31,32 detecting energy such as visible wavelength light which light is reflecting from the surface of MCF component 10. Camera system 31,32 thus detects colored portion 18 on the surface of MCF component 10. This information is transmitted to controller 34 for tracking the orientation of the core elements in MCF component 10. Exemplary controller, scanning cameras, and applicators are disclosed in U.S. Pat. Nos. 6,293,081, 5,904, 037, and 5,729,966 of Corning Cable Systems which are relied upon and incorporated by reference herein.

To further explain the process, a caterpuller is a traction device with moving belts, having potentially variable speeds, arranged to frictionally engage an elongate article such as a fiber, cable, or cable components, and to draw or force the article in a generally rectilinear direction, for example, drawing an article off of a reel and propelling it toward an extrusion die. With reference to FIG. 4, a caterpuller 33 contains upper and lower drive belts 33a and 33b respectively. Upper drive belt 33a has a rotational drive that moves MCF component 10 through the process, and lower drive belt 33b has a lateral drive which causes MCF component 10 to roll or twist between belts 33a,33b. Controller 34 adjusts the dispositions of caterpuller 33 based on inputs from detectors 31,32 such that the orientation of MCF component 10, based on detection of colored portion 18, is established and maintained in relation to core elements 14,15,16,17. As such, MCF component 10 passes through a coloring die 35 that applies a UV curable layer defining coating portion 21, for example, which can be translucent, transparent, or of a first color such as white, red, or orange. At least one applicator 36 applies a second material to coating portion 21 in the form of a stripe, dashed line, or combination thereof defining colored portion 22, which is to be visually distinct from coating portion 21, and thus portion 22 can be a second color for example, black or blue. The coating portion 21 and colored portion 22 are cured by a UV-light source 37 to produce a marked MCF 20. Colored portion 22 defines a reference section for an operator's connector termination purposes, and, in this embodiment, the colored portion comprises a color that is, to an operator's observation, visually distinct from coating portion 21.

In further exemplary embodiments, one or more marked MCF 20 can be constrained relative to a further layer of material such as an optical fiber ribbon matrix (FIG. 8) or a tight buffered cable jacket (FIG. 10). In such a case, an optional reference section can be added comprising a groove, dent, or colored portion, such as colored portion 52 (FIG. 8) and colored portion 23a (FIG. 10), and which colored portion in each case is generally aligned with a respective colored portion 22.

Figure 8:
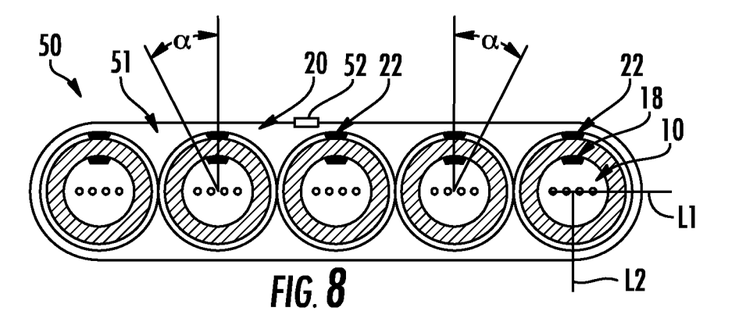
FIG. 8 schematically depicts an embodiment of marked multicore optical fibers implemented in an optical fiber ribbon according to one or more embodiments shown and described herein.

More specifically, groupings of MCFs 20 can be formed as a first example in the form of ribbon cable 50 (FIG. 8) with marked MCFs 20 aligned within the ribbon. Marked MCFs 20 are bonded together with a matrix material 51, for example, a UV-light curable acrylate matrix. Colored portions 22 of each marked MCF 20 in optical fiber ribbon 50 can be generally aligned, for example, toward the same direction or side of the ribbon, such as toward the side of colored portion 52. Alternatively, the colored portions 22 can be aligned in different directions within the same optical ribbon, for example, MCFs 20 that are to be utilized by an operator as transmit data (Tx) can be aligned toward one side of the optical fiber ribbon, and MCFs 20 that are to be utilized by an operator to receive data (Rx) can be aligned toward a different direction. Alignment variations, for example, can be set according to an angle α of about 45 from line L1 or L2 (FIG. 8).

Optical fiber ribbon 50 can be connectorized with multifiber connectors, for example, commercially available push on MPO or MTP® fiber optic connectors. As an alternative to FIG. 8, optical core elements can be arranged in a column format so that the optical core elements are generally aligned with line L2 rather than line L1. An entire column of fiber will enable each fiber to be connected in the same orientation to transceivers on both the proximal and distal sides of the fiber ribbon. On a row by row basis, such as an optical ribbon 50, a twist of the ribbon will arrange the optical fiber cores, and for a multicore fiber having columns and rows of optical core elements, a shuffle with a left to right mirror image transposition arrangement of the cores would maintain the optical core elements on the correct orientation at both ends.

Figure 9:
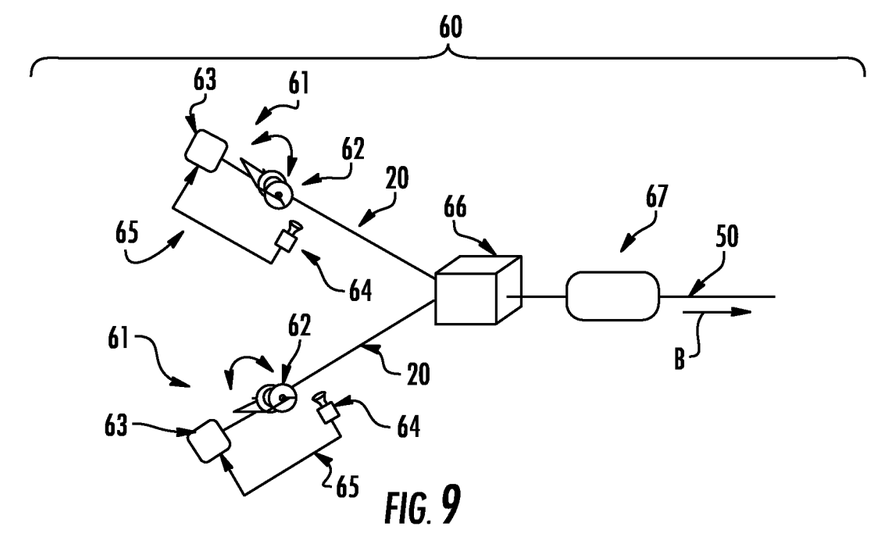
FIG. 9 schematically depicts another manufacturing process according to one or more embodiments shown and described herein for making the marked multicore fiber.

FIG. 9 shows an exemplary optical fiber ribbon manufacturing line 60 moving product generally in direction "B" with marked MCFs 20 having colored portions 22 generally aligned. This means the colored portions are within 0-45 degrees of each other relative to the top center of the optical fiber as angle α illustrates in FIG. 8. Process 60 has a series of fiber pay-off assemblies 61, for example, four to six assemblies 61, each supplying the aligned MCFs 20 into a coating die 66 which coats the marked MCFs 20 with matrix material 51. The number of fiber pay-off assemblies 61 is determined by the number of marked MCFs 20 desired for the optical ribbon 50 being manufactured. For example, a 4-fiber ribbon would have four pay-offs 61, and a 12-fiber ribbon would have twelve pay-offs 61. Pay-off assemblies 61 each comprise a reel assembly that allows its marked MCF 20 to pay off under controlled tension. Scanning cameras 64 are positioned to observe marked MCFs 20 to determine the orientation of the colored section 22 and provide a feedback control signal 65 to a drive motor 63 that rotates the respective reel assemblies 62 to control the orientation of MCFs 20. Matrix material 51 is in turn cured by a UV-light source 67 to produce optical fiber ribbon 50 with MCFs 20 having colored portions 22, which as described above, can be aligned according to the same or different angles.

As described above, one or more marked MCF 20s can be constrained relative to a further layer of material such as a tight buffered cable jacket (FIG. 10). In such a case, an optional reference section can be added comprising a groove, dent, or colored portion, such as colored portion 23a (FIG. 10). Similar to the process of making optical fiber ribbon 50, scanning cameras can be used to detect colored portion 22 and then an extrusion die would extrude a tight buffered cable jacket onto coating portion 21, and another applicator 36 would apply the colored portion 23a.

The foregoing embodiments allow for a single transceiver design to be used on both ends of marked MCF 20, and it also allows operators assembling the parts to use the same termination procedure on either end of marked MCF 20. For example, a proximal transceiver (not shown) may have two transmit ports T1 and T2 and two receive ports R1 and R2. As viewed from the end of the transceiver, the ports would be arranged from left to right for example as T1, T2, R2, R1 (FIG. 11). The outer two ports T1,R1 define a two-way communication channel 1 and the inner two ports T2,R2 define a two-way communication channel 2. Marked MCF 20 with colored portion 22 positioned up in the proximate transceiver would place core element 14 in communication with a transmitter T1, core element 15 in communication with transmitter T2, core element 16 in communication with receiver R2, and core element 17 in communication with receiver R1. The distal end of the multicore fiber would be placed into the distal transceiver in the same orientation with colored portion 22 oriented in an up position which would align core element 14 with receiver R1 and core element 17 with transmitter T1. Thus the signal from transmitter T1 in the proximal transceiver will go to receiver R1 in the distal transceiver via core element 14. Likewise, the signal from transmitter T1 in the distal transceiver will go to receiver R1 in the proximal transceiver over core element 17. When attaching a connector to marked MCF 20, the connector is assembled with colored portion 22 toward the top of the connector on both ends of the fiber, which will ensure that the cores 14,15,16,17 are aligned with the correct ports.

To further illustrate, reference line L2 is on a line of symmetry of marked MCF 20 that does not intersect any core elements, and optical core elements on the left hand side of line L2 (FIG. 10) of marked MCF 20, for example core elements 14 and 15, have essentially a corresponding mirror image of core elements on the right side of line L2, for example, core elements 16 and 17. In an exemplary embodiment, when the cable is in a loop of a 180 degree bend, as in a factory termination procedure, and as shown in FIG. 11, core elements 14 and 15 define a pair of corresponding core elements and core elements 16 and 17 also define a pair of corresponding core elements. Core elements 14 and 15 are above line L2 and are disposed for optical communication with transmitters at the proximal end of the cable "P". At a distal end of the cable "D", core elements 14,15 are below line L2 for optical communication with receivers. Similarly, core elements 16 and 17 are disposed at distal end D of marked MCF 20 above line L2 for optical communication with transmitters, and they are below line L2 for optical communication with receivers at the proximal end P of marked MCF 20. In other words, each core element 14,15,16,17 is to be connected at each end P and D, for example, to respective optical connectors, which are in turn associated with transceivers. To accomplish the correct connections on both sides, for example, the same transceiver design can be used on both ends, and the operator is to make sure the at least one colored portion 22 is positioned indicating alignment of the optical elements with the optical connector. The relative positions of the transmitter and receiver do not need to be inverted thus simplifying the design and deployment of the transceivers. For example, colored portion 22 aligned with line L2 is at the top at both ends of the fiber/cable and is to be aligned with a connector for termination.

As a further illustration, Marked MCF 20 can interface with connector portions 25a,25b having respective angled polished ends 20a,20b as shown in FIG. 12. Angular polished ends 20a,20b are oriented relative to cores 14,15,16,17 in a way that the polished ends can be arranged for connection on either end P,D with devices such as connectors, a mid-span connector 26, or transceivers. Line L2 is generally in the plane of the angularly polished surfaces 20a,20b, and line L1 is aligned with the optical core elements 14,15,16,17 and transits the angled polish plane but is generally transverse to the plane of the angled polish. Line L1 will form an angle relative to the angularly polished surface generally equal to the angle of the polish. The polish angle being, for example, an angle of about 8-9 degrees relative to line L1. Both ends P,D of marked MCF 20 can be prepared by the process of flock polishing. An exemplary flock polishing technique is described in U.S. Pat. No. 6,106,368 of Corning Cables Systems which is relied upon and incorporated herein by reference. For orientation of mating connector parts, the optical connector includes a key 27 (FIG. 13). In an exemplary embodiment, colored portion 22 is aligned with key 27 along the same axis, and line L2 is generally aligned with key 27 as well. The disposition of key 27 is at an angle β relative to the optical core elements and line L1 (FIG. 13), and angle β can be in the range of about 45 degrees to about 90 degrees. Colored portion 18 can be aligned with colored portion 22 (FIG. 10) or radially offset therefrom (FIG. 2). Both ends of marked MCF 20 can be attached to a respective fiber optic connecter, as described above, defining a jumper cable assembly, or only one end can be attached to a connector thereby defining a pigtail cable assembly. As described above, colored portions 18 and 22 can be in the non-aligned positions with respect to each other (FIG. 2) and during connectorization. In alternative embodiments, colored portion 22 will be on a first side of the proximal termination side, and on the opposing side of the distal termination side, and with colored portion 18 on the top in (FIG. 12), and coating 21 should be transparent or translucent so that colored portion 18 is observable therethrough.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A ribbon cable comprising:
a grouping of marked multicore optical fibers,
each, marked multicore optical fiber comprising:
(a) optical core elements, the optical core elements defining an array of at least two optical core elements contained within a common outer cladding, the common outer cladding being at least partially surrounded by a coating layer disposed externally of the cladding, and the optical core elements being aligned generally along a first reference line and being capable of transmitting data; and
(b) the multicore optical fiber comprising at least one reference section adjacent to the coating layer;
wherein the reference section comprises at least one colored portion and the coating layer comprises a colored material wherein a color of the at least one colored portion is distinct from a color of the colored material of the coating layer;
wherein the grouping of marked multicore optical fibers are aligned within the ribbon in accordance with colored portions of adjacent optical fibers.

2. The ribbon cable of claim 1, wherein the colored portion is selected from a UV light curable resin material and an ink material, and combinations thereof.

3. The ribbon cable of claim 1, wherein the colored portion extends along the multicore optical fiber and comprises a form of one of a continuous line, an intermittent line, a ring, and a combination thereof.

4. The ribbon cable of claim 1, wherein the colored portion comprises one of a co-extruded layer adjacent the coating layer and a material applied to an outer surface of the coating layer and combinations thereof.

5. The ribbon cable of claim 1, wherein the colored portion comprises being disposed generally in alignment with the reference line.

6. The ribbon cable of claim 1, wherein the colored portion comprises being disposed generally above the reference line.

* * * * *